Nov. 13, 1962   J. C. LINVILLE   3,063,200
HORSE TRAILER ROOF STRUCTURE
Filed July 10, 1959   2 Sheets-Sheet 1

James C. Linville
INVENTOR.

BY *Clarence A. O'Brien*
and *Harvey B. Jacobson*
Attorneys

Nov. 13, 1962 J. C. LINVILLE 3,063,200
HORSE TRAILER ROOF STRUCTURE
Filed July 10, 1959 2 Sheets-Sheet 2

James C. Linville
INVENTOR.

BY Clarence A. O'Brien
and Harvey B. Jacobson
Attorneys

United States Patent Office 3,063,200
Patented Nov. 13, 1962

3,063,200
HORSE TRAILER ROOF STRUCTURE
James C. Linville, Rte. 1, Chickasha, Okla.
Filed July 10, 1959, Ser. No. 826,343
2 Claims. (Cl. 50—52)

This invention relates to trailer constructions and more particularly to the roof structure thereof.

An object of the invention is to provide new and useful improvements in the construction of the roof of a trailer. The trailer may be selected from any of the types for instance, house trailers, horse trailers and others. There is quite a problem experienced in the roof structure of certain types of trailers which undergo high torsional stresses. The roof structure in accordance with the invention is especially designed to overcome the breakage, cranks and similar defects which develop at or near the roof structure of such trailers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6:
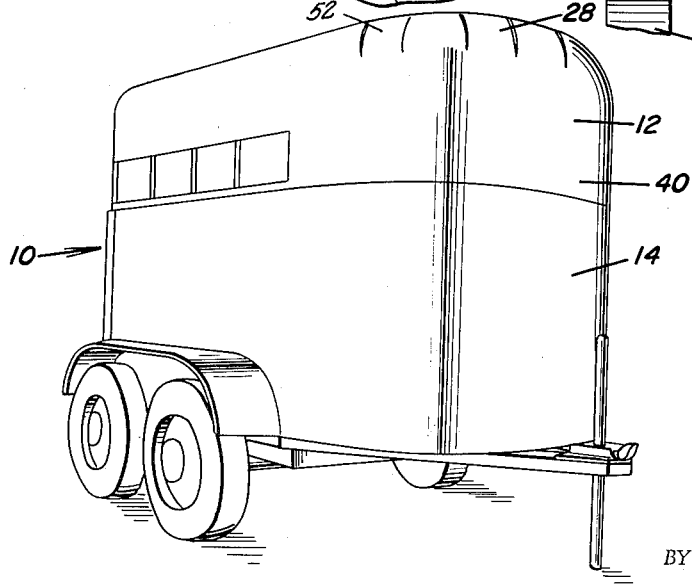
FIGURE 6 is a perspective view of a particular trailer equipped with a roof structure in accordance with the invention.

In the accompanying drawings FIGURE 6 shows a conventional trailer 10 equipped with a roof structure 12 to overcome mechanical failures in the roof structure of the otherwise conventional trailer. One such trailer which well benefits by the invention is a horse trailer and therefore trailer 10 diagrammatically represents a horse trailer. The lower portion 14 of the trailer is completely conventional and has a body including side walls on which frame 16 is set and fixed, for instance by riveting and/or spot welding or by seam welding or by any other technique. Frame 16 is made of a lower frame member 18 preferably of flat stock and fitting the general horizontal cross-sectional shape of lower portion 14 of the trailer body. There is an upper frame member 20 made of bar stock and of the same general shape as lower frame member 18 but of a smaller plan area. A plurality of upright struts 22 vertical portions of which form a two dimensionally curved panel supporting surface, are provided with feet 24 at the lower ends which seat upon the upper surface of lower frame member 18. The upper ends are butt welded or otherwise joined to upper frame member 20. There is a slight arch or bow portion 26 near the upper extremities of struts 22 to form a three dimensional transition curvature 28 terminating tangentially at the top flat roof surface at the upper corner of the trailer roof structure. A reinforcing stay bar or rod 30 is welded or otherwise fixed to inner surfaces of the struts 22.

A roof panel 34 made of light gauge metal, is provided with peripheral tabs 36 that are located above the upper frame member 20 to which they are welded or otherwise fastened. The shape of panel 34 will be the same as the general geometrically similar shape of the trailer body outline when viewed from above.

Figure 1:
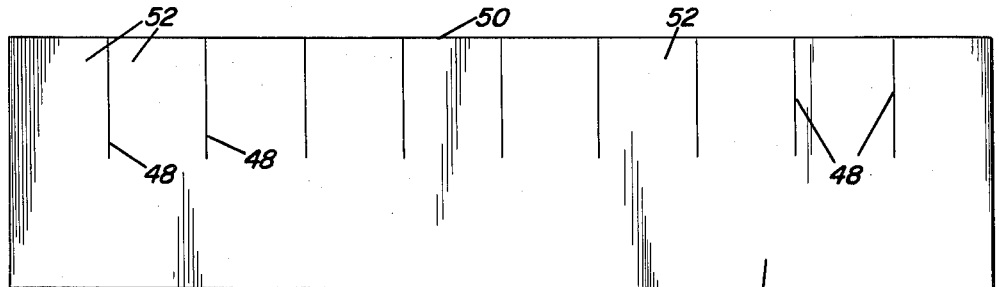
FIGURE 1 is a plan view of a panel from which a portion of the roof structure is made.
Figure 2:
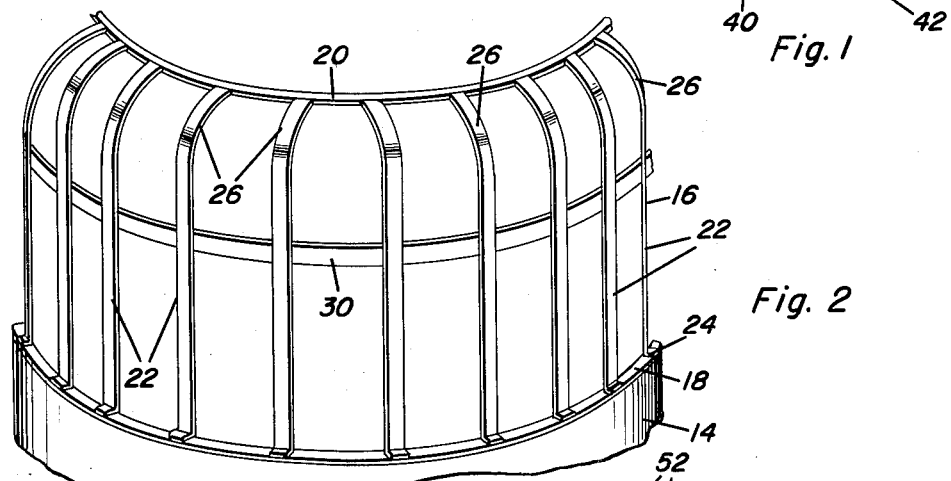
FIGURE 2 is a perspective view of the frame of the roof structure, this view being a fragmentary view.
Figure 3:
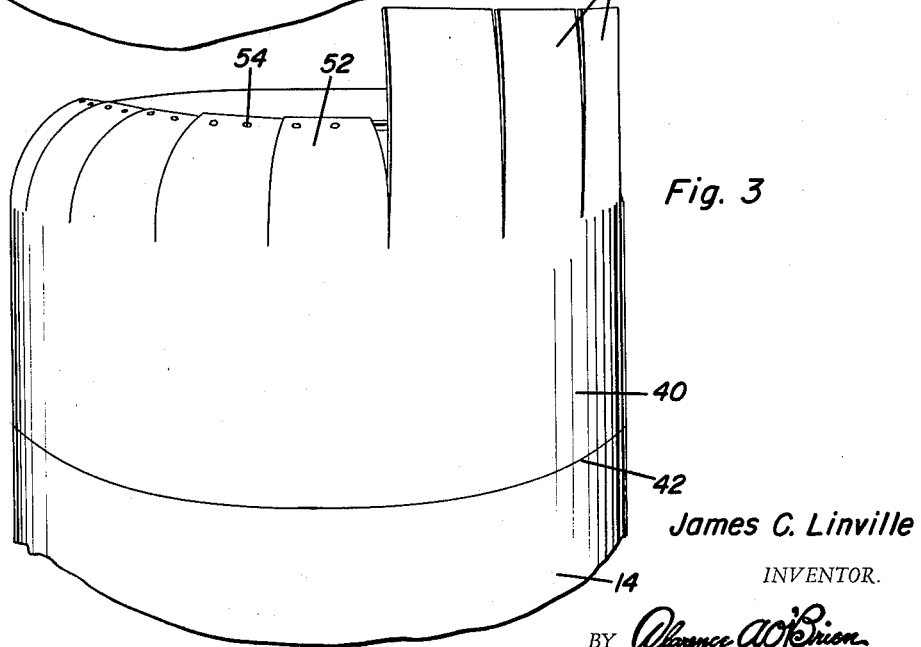
FIGURE 3 is a perspective view showing the roof structure under construction.
Figure 4:
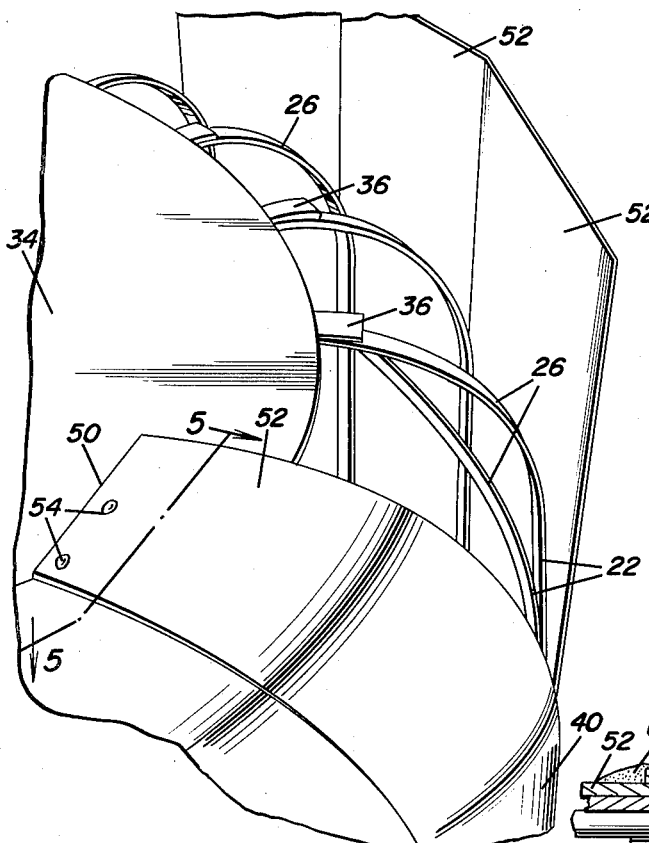
FIGURE 4 is another perspective view somewhat similar to FIGURE 3 but observing the roof structure from another angle.
Figure 5:
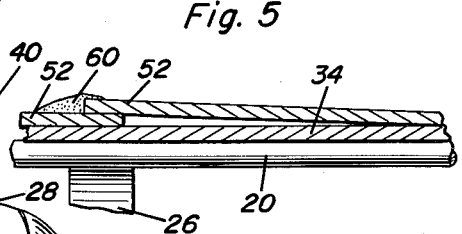
FIGURE 5 is an enlarged sectional view taken on the line 5—5 of FIGURE 4.

Panel 40 is rectangular and made of lightweight bendable metal. The lower edge 42 of panel 40 seats over the edge of lower frame member 18 or may seat in front of the feet 24, with edge 42 in engagement with lower frame member 18. The panel 40 is secured, at edge 42, to the lower frame member 18. The fastening may be made by welding, riveting, or bolting, screwing etc., it being preferred that there be a welded joint to provide a finished appearance and for strength of construction and weather sealing. A number of slits 48 extend from edge 50 that parallels edge 42, toward the longitudinal center line of panel 40 thereby forming a number of essentially rectangular plates for integral split formations 52. As shown in FIGURE 3 these plates are bent over the curvature portions 26 of upright struts 22 and they are overlapped without being welded or otherwise fastened to the frame but only to roof panel 34 along edges 50 thereof. This feature is emphasized, noting that the plates 52 overlap but are not mechanically connected together, so that they are capable of a limited amount of sliding with reference to each other and over each other as the trailer undergoes torsional loads. It is only the upper parts of plates 52 that are fixed and the fastening is made preferably by rivets 54 passing through the edge portions of plates 52, panel 34 to thus hold the panel in place in this way. Weather sealing at the upper edges of plates 52, and along the overlapped portions, if found desirable, of the plates 52 is achieved by calking compound 60 (FIGURE 5) applied at the joints.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A roof structure for a trailer, said roof structure comprising a frame having a lower frame member and an upper frame member, a plurality of members secured to said upper and lower frame members and having curvatures adjacent to said upper frame member, a single integral metallic panel joined at one edge to said lower frame member and having a plurality of split integral formations defined therein by means of slits in the panel, said formations being overlapped at the longitudinal side edges thereof for support on the upper frame member without being secured thereto, a roof panel secured to said upper frame member to which roof panel said formations are secured, mechanical means securing the upper end portions of said formations to said roof panel leaving the side edges of said formations free to slide with reference to each other.

2. In a roof structure for a mobile trailer which has a body, a frame secured to the upper part of said body, a roof panel connected with said frame, a second integral metallic panel secured at one edge to a lower part of said frame and having a plurality of slits at the upper edge thereof thereby defining a plurality of individual split formations, said split formations being overlapped and slidable with reference to each other, and mechanical means securing the upper ends of said formations to said roof panel leaving the overlapped portions of said formations free to slide over each other in response to torsional loads imposed on the trailer body, said frame having upright members, an upper frame member and a lower frame member, said upper frame member being of a smaller configuration than the lower frame member, said upright members having curvatures therein adjacent to said upper frame member so that when said formations are fitted over said upright frame members and on said curvatures there is a resulting curvature in the roof structure at the overlapped portions of said formations.

References Cited in the file of this patent

UNITED STATES PATENTS

| | | |
|---|---|---|
| D. 174,903 | Gray | June 7, 1955 |
| 240,868 | Waters | May 3, 1881 |
| 1,896,891 | Gibbs et al. | Feb. 7, 1933 |
| 1,912,931 | Clay | June 6, 1933 |
| 1,965,736 | Dillman | July 10, 1934 |
| 2,092,722 | Bangert | Sept. 7, 1937 |
| 2,112,348 | Rutten | Mar. 29, 1938 |
| 2,223,713 | Zigler | Dec. 3, 1940 |
| 2,690,185 | Pomykala | Sept. 28, 1954 |
| 2,753,818 | Green | July 10, 1956 |

FOREIGN PATENTS

| | | |
|---|---|---|
| 438,363 | Italy | Aug. 6, 1948 |